(12) United States Patent
Hotta et al.

(10) Patent No.: US 8,018,784 B2
(45) Date of Patent: Sep. 13, 2011

(54) SEMICONDUCTOR DEVICE AND DATA PROCESSOR

(75) Inventors: Yoshihiko Hotta, Tokyo (JP); Seiichi Saito, Tokyo (JP); Hiroyuki Hamasaki, Tokyo (JP); Hirotaka Hara, Tokyo (JP); Itaru Nonomura, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 95 days.

(21) Appl. No.: 12/636,528

(22) Filed: Dec. 11, 2009

(65) Prior Publication Data
US 2010/0182848 A1 Jul. 22, 2010

(30) Foreign Application Priority Data

Jan. 16, 2009 (JP) .................................. 2009-008005

(51) Int. Cl.
*G11C 7/00* (2006.01)
*G11C 8/00* (2006.01)
(52) U.S. Cl. ............ 365/189.05; 365/233.1; 365/233.11
(58) Field of Classification Search ............... 365/233.12
See application file for complete search history.

(56) References Cited

U.S. PATENT DOCUMENTS 5,250,857 A * 10/1993 Miyazaki ...................... 326/106
6,108,244 A * 8/2000 Lee et al. .................. 365/189.05

FOREIGN PATENT DOCUMENTS

JP 2003-308289 A 10/2003

* cited by examiner

*Primary Examiner* — Tan T. Nguyen
(74) *Attorney, Agent, or Firm* — Miles & Stockbridge P.C.

(57) ABSTRACT

To improve the speed of accessing a low-speed circuit block from a high-speed circuit block without significantly increasing power consumption.

In a data processor having a bus controller that performs timing control of access from the CPU operated in synchronization with a high-speed first clock signal to a peripheral circuit operated in synchronization with a low-speed second clock signal, a timing control circuit is provided between the peripheral circuit and the bus controller, and the bus controller causes, in response to a read instruction from the peripheral circuit, the timing control circuit to output data held by the peripheral circuit to the bus controller in synchronization with the cycle of the high-speed clock signal, causes the timing control circuit to start, in response to a write instruction directed to the peripheral circuit, writing into the peripheral circuit in synchronization with the cycle of the high-speed clock signal, and terminates the writing in synchronization with the cycle of the low-speed clock signal.

19 Claims, 12 Drawing Sheets

SEMICONDUCTOR DEVICE AND DATA PROCESSOR

CROSS-REFERENCE TO RELATED APPLICATION

The disclosure of Japanese Patent Application No. 2009-8005 filed on Jan. 16, 2009 including the specification, drawings and abstract is incorporated herein by reference in its entirety.

BACKGROUND OF THE INVENTION

The present invention relates to a semiconductor device comprising circuit blocks with different operation speeds, and further relates to a technology of improving access responsiveness to low-speed circuit blocks in a data processor.

Semiconductor devices such as a system-on-chip data processor having circuit blocks that perform high-speed operation, such as a CPU, and peripheral circuits that perform low-speed serial communication, mounted on the same semiconductor substrate are widely used. In such a kind of semiconductor device, a circuit block that performs high-speed operation is coupled to an on-chip high-speed bus, a circuit block that performs low-speed operation is coupled to an on-chip low-speed bus, and both buses are coupled by a bus bridge circuit. The bus bridge circuit performs timing control on difference of bus access operation in both buses to allow access operation across both buses. Japanese Patent Laid-Open No. 2003-308289, for example, describes a configuration of coupling the low-speed bus and the high-speed bus by a bus bridge circuit.

When the CPU operating at a high speed accesses a peripheral circuit via a low-speed bus, the CPU stalls until a low-speed bus cycle is completed, degrading system performance thereby. Particularly, because operating frequency of peripheral circuits has shown little improvement compared with the recent improvement of operating frequency of the CPU, a large gap has developed between operating frequencies of the low-speed bus and the high-speed bus, making it difficult to bring about a performance that matches the improvement of operating frequency of the CPU.

For example, under the management of a real time OS, interrupt response significantly affects the system performance in an application that frequently uses an interrupt to control built-in devices. In order to respond to an interrupt, the CPU must analyze a cause of the interrupt for an interrupt requestor. In many cases, it is necessary to read a number of internal registers for the peripheral circuit which is the interrupt requestor. In such an occasion, desirable interrupt response cannot be obtained if it takes a long time to access the registers of the peripheral circuit coupling to the low-speed bus.

Although the performance degradation can be avoided by installing a high-speed bus interface in the peripheral circuit operating at a low speed and coupling it to a high-speed bus, employing a high-speed bus interface in many circuits causes undesired increase of power consumption. Since a system-on-chip semiconductor device has many peripheral circuits mounted thereon, this can lead to wasting a large amount of electricity. For example, if more than 20 peripheral circuits are mounted, it is no longer realistic to install a high-speed bus interface in the low-speed peripheral circuit.

The present invention has been made in view of the above circumstances and provides a semiconductor device, and further a data processor, that can improve the speed of accessing a low-speed circuit block from a high-speed circuit block without significantly increasing power consumption.

It is another purpose of the present invention to provide a semiconductor device, and further a data processor, that can improve interrupt response without significantly increasing power consumption.

The other purposes and the new feature of the present invention will become clear from the description of the present specification and the accompanying drawings.

SUMMARY OF THE INVENTION

The following explains briefly the outline of a typical invention among the inventions disclosed in the present application.

That is, in a data processor having a bus controller that performs timing control of access from the CPU operated in synchronization with a high-speed first clock signal to a peripheral circuit operated in synchronization with a low-speed second clock signal, a timing control circuit is provided between the peripheral circuit and the bus controller, and the bus controller causes, in response to a read instruction from the peripheral circuit, the timing control circuit to output data held by the peripheral circuit to the bus controller in synchronization with the cycle of the high-speed clock signal, causes the timing control circuit to start, in response to a write instruction directed to the peripheral circuit, writing into the peripheral circuit in synchronization with the cycle of the high-speed clock signal, and terminates the writing in synchronization with the cycle of the low-speed clock signal. In short, the writing period is defined as a period from the start of access that synchronizes with the high-speed clock signal to the end of access that synchronizes with the low-speed clock signal, whereas the reading period is defined as a cycle period that synchronizes with the high-speed clock signal.

From the foregoing, high-speed bus access is possible while operating the peripheral circuit by the low-speed clock, whereby system performance can be improved while suppressing power consumption. Access time required for detecting the cause of interrupt to the peripheral circuit can be significantly reduced, which also contributes to improvement of system performance in terms of interrupt response.

The following explains briefly the effect acquired by the typical invention among the inventions disclosed in the present invention.

The speed of accessing a low-speed circuit block from a high-speed circuit block can be improved without significantly increasing power consumption.

Additionally, interrupt response can be improved without significantly increasing power consumption.

DETAILED DESCRIPTION OF THE PREFERRED EMBODIMENTS

Outline of the Embodiment

Figure 1:
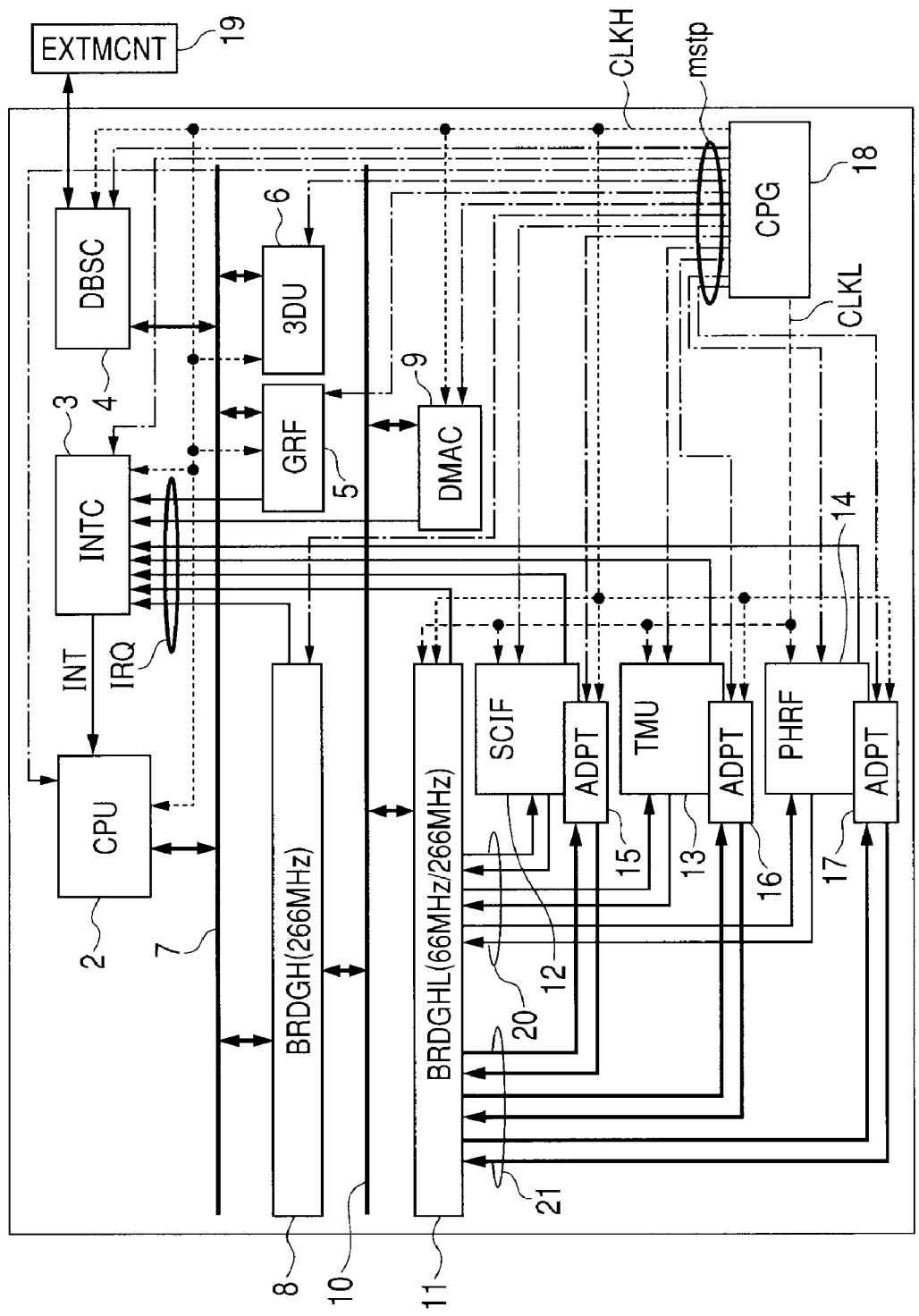
FIG. 1 is a block diagram showing a system-on-chip (SOC) data processor as an exemplary semiconductor device according to the present invention.

First, an embodiment representing the invention disclosed herein will be outlined. The reference numerals of the drawings are bracketed when referred to in the outline of the representative embodiment, and they only indicate what are included in the concept of the components to which they are provided.

[1] A semiconductor device according to a representative embodiment of the present invention comprises a first circuit (2, 9) operated in synchronization with a first clock signal (CLKH); a second circuit block (12, 13, 14) operated in synchronization with a second clock signal (CLKL) having a frequency lower than that of the first clock signal; a bridge circuit (11) that performs timing control of access from the first circuit to the second circuit block; and a third circuit block (15, 16, 17) provided between the second circuit block and the bridge circuit to perform, based on an instruction from the bridge circuit, an operation of outputting data held by a storage circuit (31, 31A, 31B) in the second circuit block to the bridge circuit in synchronization with the cycle of the first clock signal.

[2] In the semiconductor device of paragraph 1, the bridge circuit starts, in response to an instruction of a read operation directed to the storage circuit from the first circuit, an output operation cycle to the bridge circuit by the third circuit block in synchronization with the cycle of the first clock signal, waits for a notice of completion of the output operation by the third circuit block, and terminates the output operation cycle.

[3] In the semiconductor device of paragraph 2, the bridge circuit starts, in response to an instruction of a write operation directed to the storage circuit from the first circuit, a write operation into the storage circuit in synchronization with the cycle of the first clock signal, waits for a notice of completion of the write operation into the storage circuit synchronizing with the cycle of the second clock signal, and terminates the write operation cycle.

[4] In the semiconductor device of paragraph 3, the first circuit is a CPU (2), further comprising an interrupt controller (3) that outputs an interrupt signal (INT) to the first circuit in response to interrupt request from the second circuit block.

[5] In the semiconductor device of paragraph 3, the second circuit block has a register circuit (31) as the storage circuit, latch timing of the register circuit is controlled in synchronization with the second clock signal and selection timing of a latch output signal of the register circuit is synchronized with the second clock signal. The third circuit block receives the latch output signal of the register circuit, and the selection timing of the received latch output signal is synchronized with the first clock signal.

[6] In the semiconductor device of paragraph 3, the second circuit block is a clock synchronization type RAM (31B) that can operate as the storage circuit using the cycle of the second clock signal as a memory cycle. The third circuit block has a latch circuit (45) that latches the data read from the clock synchronization type RAM in synchronization with the second clock signal.

[7] In the semiconductor device of paragraph 3, the second circuit block is a clock synchronization type RAM (31A) that can operate as the storage circuit using the cycle of the first clock signal as a memory cycle. The second circuit block operates the clock synchronization type RAM using the cycle of the second clock signal as a memory cycle. The third circuit block operates the clock synchronization type RAM using the cycle of the first clock signal as a memory cycle.

[8] A semiconductor device according to another aspect of the present invention comprises a first circuit operated in synchronization with a first clock signal; a second circuit block operated in synchronization with a second clock signal having a frequency lower than that of the first clock signal; abridge circuit that performs timing control of access from the first circuit to the second circuit block and has a first mode (high-speed mode) and a second mode (low-speed mode) ; and a third circuit block provided between the second circuit block and the bridge circuit. The bridge circuit in the first mode causes the third circuit block to output data held by the storage circuit within the second circuit block to the bridge circuit in synchronization with the cycle of the first clock signal and, in the second mode, causes the second circuit block to output data held by the storage circuit to the bridge circuit in synchronization with the cycle of the second clock signal.

[9] In the semiconductor device of paragraph 8, the bridge circuit in the first mode starts, in response to an instruction of a read operation directed to the storage circuit from the first circuit, an output operation cycle to the bridge circuit by the third circuit block in synchronization with the cycle of the first clock signal, waits for a notice of completion of the output operation by the third circuit block, and terminates the output operation cycle.

[10] In the semiconductor device of paragraph 9, the bridge circuit in the first mode starts, in response to an instruction of a write operation directed to the storage circuit from the first circuit, a write operation into the storage circuit in synchronization with the cycle of the first clock signal, waits for a notice of completion of the write operation into the storage circuit synchronizing with the cycle of the second clock signal, and terminates the write operation cycle.

[11] In the semiconductor device of paragraph 10, the bridge circuit has a mode register that stores mode data for specifying which of the first mode or the second mode will be applied for each access target, and a bus access control unit that performs timing control of access in the mode based on the mode data stored in the mode register according to the access address from the first circuit.

[12] In the semiconductor device of paragraph 11, the second circuit block has a register circuit as the storage circuit, latch timing of the register circuit is controlled in synchronization with the second clock signal and selection timing of the latch output signal of the register circuit is synchronized with the second clock signal. The third circuit block receives a latch output signal of the register circuit, and selection timing of the received latch output signal is synchronized with the first clock signal.

[13] In the semiconductor device of paragraph 11, the second circuit block is a clock synchronization type RAM that can operate as the storage circuit using the cycle of the second clock signal as the memory cycle. The third circuit block has a latch circuit that latches the data read from the clock synchronization type RAM in synchronization with the second clock signal.

[14] In the semiconductor device of paragraph 11, the second circuit block is a clock synchronization type RAM that can operate as the storage circuit using the cycle of the first clock signal as the memory cycle. The second circuit block operates the clock synchronization type RAM using the cycle of the second clock signal as the memory cycle. The third circuit block operates the clock synchronization type RAM using the cycle of the first clock signal as the memory cycle.

[15] A data processor according to the present invention comprises a CPU (2) operated in synchronization with the cycle of the first clock signal (CLKH); a plurality of peripheral circuits (12, 13, 14) operated in synchronization with a second clock signal (CLKL) having a frequency lower than that of the first clock signal; a bus controller (11) that performs timing control of access from the CPU to the peripheral circuits; and timing control circuits (15, 16, 17) that are provided between the peripheral circuits and the bus controller and perform an operation of outputting data held by the peripheral circuits to the bus controller based on the instruction from the bus controller in synchronization with the first clock signal.

[16] A data processor of paragraph 15 further comprises an interrupt controller that outputs an interrupt signal to the CPU in response to an interrupt request from the peripheral circuit.

[17] In a data processor of paragraph 16, the bus controller starts, in response to an instruction of a read operation directed to the peripheral circuit from the CPU, an output operation cycle to the bus controller by the timing control circuit in synchronization with the cycle of the first clock signal, waits for a notice of completion of the output operation by the timing control circuit, and terminates the output operation cycle.

[18] In a data processor of paragraph 17, the bus controller starts, in response to an instruction of a write operation directed to the peripheral circuit from the CPU, a write operation into the peripheral circuit in synchronization with the cycle of the first clock signal, waits for a notice of completion of the write operation into the peripheral circuit synchronizing with the cycle of the second clock signal, and terminates the write operation cycle.

[19] A data processor according to another aspect of the present invention comprises a CPU operated in synchronization with a first clock signal; a plurality of peripheral circuits operated in synchronization with a second clock signal having a frequency lower than that of the first clock signal; a bus controller that performs timing control of access from the CPU to the peripheral circuits; and a timing control circuit that is provided between the peripheral circuits and the bus controller. The bus controller causes the timing control circuit to output data held by the peripheral circuits to the bus controller in synchronization with the cycle of the first clock signal in response to a read instruction from the peripheral circuits, starts writing into the peripheral circuits in synchronization with the cycle of the first clock signal in response to a write instruction into the peripheral circuits, and terminates the writing in synchronization with the cycle of the second clock signal.

Details of the Embodiment

The embodiments will be described in further detail below.
<Data Processor>

FIG. 1 shows a system-on-chip (SOC) data processor as an exemplary semiconductor device according to the present invention. A data processor 1 shown in the FIG. 1 is implemented on a single semiconductor substrate made of single crystal silicon, although not particularly limited thereto, using complementary MOS integrated circuit manufacturing technology or the like.

The data processor 1 has a bus 10 coupled via a bridge circuit (BRDGH) 8 to a bus 7 to which a central processing unit (CPU) 2 that fetches and executes an instruction is coupled, and many peripheral circuits such as a serial communication interface (SCIF) 12, a timer unit (TMU) 13, and other peripheral circuits (PHRF) 14 are coupled to the bus 10 via a bridge circuit (BRDGHL) 11.

To the first bus 7, in addition to the CPU 2, an interrupt controller (INTC) 3 that arbitrates interrupt requests carried by interrupt request signals IRQ and outputs an interrupt signal INT to the CPU 2, an external memory controller (EXTMCNT) 4 that controls an SDRAM (synchronous dynamic random access memory) operated in synchronization with the clock, a graphic processing unit (GRFU) 5 that performs drawing and display control, and a 3-dimensional processing unit (3DU) that performs 3-dimensional image processing, are coupled. The circuit blocks 2 to 6, and 8 are supplied with a clock signal CLKH generated in a clock generation circuit (CPG) 18, and operated in synchronization therewith. The clock signal CLKH has a frequency of 266 MHz, for example. A module stop signal mstp is supplied as an individual signal to each circuit module and activated to stop the operation of the corresponding circuit module, which is then brought into a low power consumption state. For example, clock signal input or/and power supply is terminated.

To the bus 10, a DMAC (direct memory access controller) 9 is coupled, which is representatively shown. The DMAC 9 is operated in synchronization with the clock signal CLKH. The bus 7 is separated from the bus 10 in order to reduce the load of the buses to which the CPU 2 is coupled as much as possible, and thus there is no essential reason for separating them in the present invention.

The buses 7 and 10 are composed of packet switching buses based on split transaction, for example. This type of bus performs processing in which a circuit requesting access transmits a request packet including content of an access request to a circuit that responses to the access request, and the circuit that responses to the access request transmits a response packet including content of the response to the circuit that requested the access. A series of processing including a request packet and a response packet is referred to as a transaction, where a single transaction can be divided for each transfer of packets to improve the efficiency of bus access. The circuit requesting access is referred to as an initiator, whereas the circuit responding to the access request is referred to as a target. There may be a circuit equipped with functions of both the initiator and the target, depending on the type of the circuit. The buses 7 and 10 comprise a packet router (not shown) that relays request packets and response packets. The packet router performs arbitration control when a plurality of initiators request accesses to a single target, or control of negating subsequent access requests for exclusive control of shared resource.

The representatively shown peripheral circuits 12 to 14 are supplied with the clock signal CLKL generated in the clock generation circuit (CPG) 18 and are operated in synchronization therewith. The clock signal CLKL has a frequency of 66 MHz, for example.

The representatively shown peripheral circuits 12 to 14 are coupled to a bridge circuit 11 via a bus 20. The bus 20 is used by an interlock method that does not accept other requests while bus access is being requested. The bridge circuit 11 functions as a bus controller that receives both of the clock signals CLKH and CLKL, and adjusts the operation timing of the bus in response to the difference of bus protocols and operation speeds between the packet switching bus 10 based on split transactions and the interlocking bus 20. The bridge circuit 11 further has a high-speed mode that performs access control to the peripheral circuits in synchronization with the clock signal CLKH and a low-speed mode that performs access control in synchronization with the clock signal CLKL, and is set by the CPU 2 to be switchable to either operation mode.

To the representatively shown peripheral circuits 12 to 14, timing control circuits (ADPT) 15 to 17 are coupled. The timing control circuits (ADPT) 15 to 17 are coupled to the bridge circuit 11 by a bus 21. Data transfer using the timing control circuits 15 to 17 by a bridge circuit is performed using the bus 21 which is different from the bus 20, although not particularly limited thereto. Each of the timing control circuits 15 to 17 is supplied with the clock signal CLKH.

In the high speed operation mode of the bridge circuit, the timing control circuits 15 to 17 cause the peripheral circuits 12 to 14 that perform output of data and latch operation of input data in synchronization with the low-speed clock signal CLKL to synchronize the read operation into the bridge circuit 10 with the high-speed clock signal CLKH, and also responds to the write instruction from the bridge circuit 11 synchronized with the high-speed clock signal CLKH.

In the high-speed operation mode, the bridge circuit 11 causes, in response to the instruction by the CPU 2 to read from the peripheral circuits 12 to 14, the timing control circuits 15 to 17 to output data held by the peripheral circuits 12 to 14 to the bus 21 in synchronization with the cycle of the clock signal CLKH, causes the timing control circuits 15 to 17 to start, in response to the instruction from the CPU 2 to write into the peripheral circuits 12 to 14, a write operation into the peripheral circuits 12 to 14 in synchronization with the cycle of the high-speed clock signal CLKH, and terminates the writing in synchronization with the cycle of the low-speed clock signal CLKL.

When an IP (intellectual property) module based on a circuit design data whose function has already been verified is used for designing the peripheral circuits 12 to 14, although not particularly limited thereto, the timing control circuits 15 to 17 play the role of an adapter module corresponding to the IP module. In this case, it suffices to simply couple the adapter module to the IP module.

<Timing Control Circuit>

Figure 2:
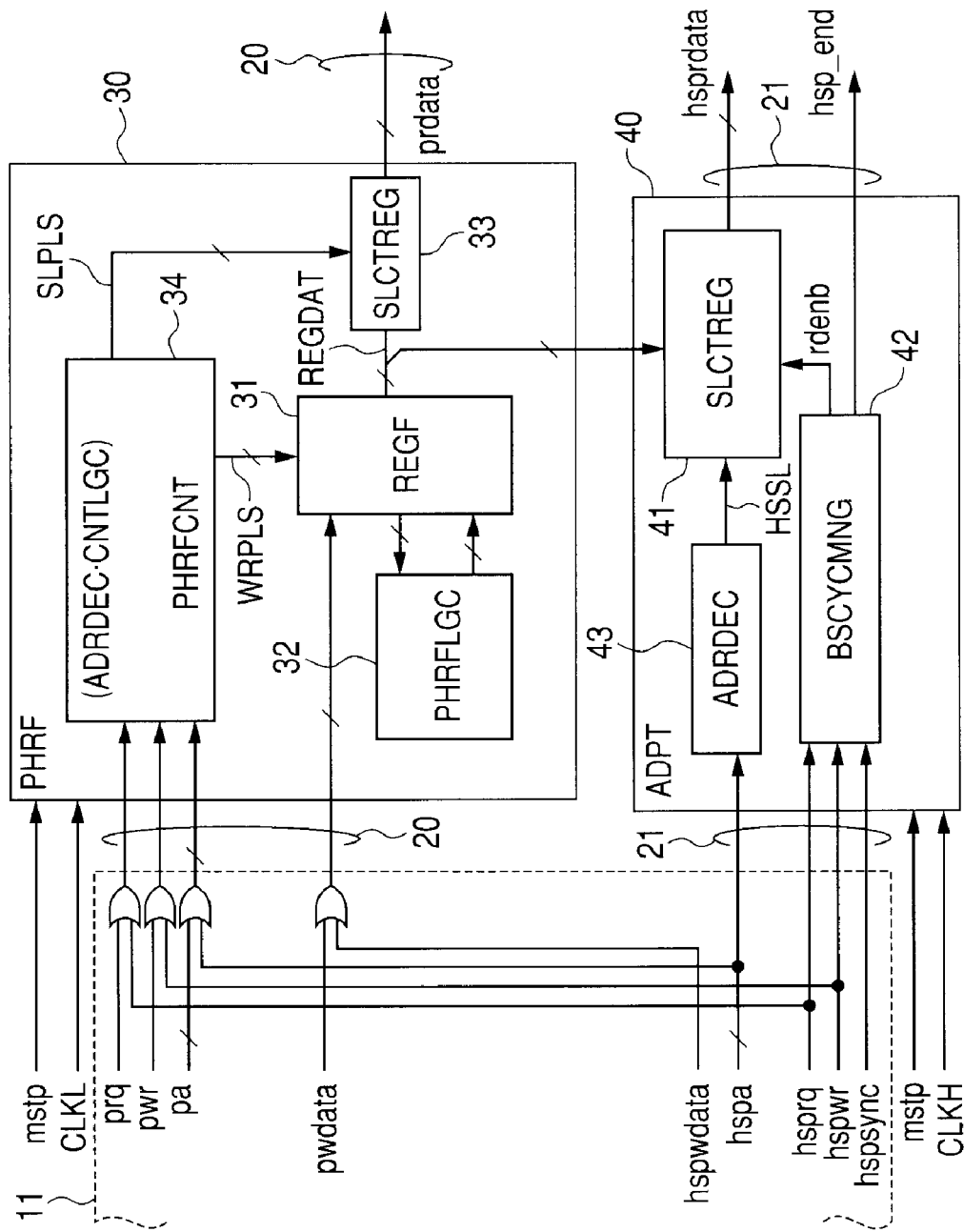
FIG. 2 is a block diagram exemplifying details of a peripheral circuit and a timing control circuit.

The timing control circuit will be described in detail below. FIG. 2 shows the peripheral circuit and the timing control circuit in detail. A peripheral circuit 3 exemplifies one of the peripheral circuits 12 to 14. A timing control circuit 40, exemplifying one of the timing control circuits 15 to 17, is provided corresponding to a peripheral circuit 30.

The peripheral circuit (PHRF) 30 has a peripheral logic circuit (PHRFLGC) 32, a register circuit (REGF) 31, an output selector (SLCTREG) 33, and a peripheral control circuit (PHRFCNT) 34 for realizing the peripheral function thereof, and accesses the register 31 in synchronization with the clock signal CLKL. The register circuit 31 has various registers such as a data register, a control register, and a status register. The registers are provided at addresses accessible from an external bus master circuit such as the CPU 2, although not particularly limited thereto.

In FIG. 2, the register data REGDAT latched by each register is output in parallel from the register circuit 31 and supplied to the output selector 33. The output selector 33 is a selection circuit that selects the register data REGDAT and outputs it to the bridge circuit 11. The peripheral control circuit 34 performs latch control on the register circuit 31 and selection control on the output selector 33. The peripheral logic circuit 32 has control logic for implementing peripheral functions such as a timer using control data and operation data that has been set in the register circuit 31 from outside. A temporary register required for operating the peripheral circuit is provided in the peripheral logic circuit, although not particularly limited thereto.

In the low-speed mode of the bridge circuit 11, an operation request signal prq, a read/write signal pwr, an address signal pa, a write data pwdata, and a read data prdata are enabled. The bridge circuit 11 changes the operation request signal prq, the read/write signal pwr, the address signal pa, and the write data pwdata in synchronization with the clock signal CLKL, and recognizes the read data prdata in synchronization with the clock signal CLKL. The signals are turned into a non-active level or high impedance in the high-speed mode of the bridge circuit 11. Particularly, the bridge circuit 11 blocks the input stage of the read data prdata in the high-speed mode and ignores it.

In the high-speed mode of the bridge circuit 11, an operation request signal hsprq, a read/write signal hspwr, an address signal hspa, a write data hspwdata, and a read data hsprdata are enabled. The bridge circuit 11 changes the operation request signal hsprq, the read/write signal hspwr, the address signal hspa, and the write data hspwdata in synchronization with the clock signal CLKH. The signals are turned into a non-active level or high impedance in the low-speed mode of the bridge circuit 11.

The peripheral control circuit 34 is activated by the high-level of the operation request signal prq/hsprq, and changes the pulse of a write pulse WRPLS that causes a single register to perform latch operation according to the result of decoding the address signal pa/hspa, when a write operation is instructed by the read/write signal pwr/hspwr.

The peripheral control circuit 34 changes the pulse of a selection pulse SLTPLS that selects a single output among the latch outputs of the register circuit 31 according to the result of decoding the address signals pa/hspa when a read operation is instructed by the read/write signal pwr/hspwr. However, the bridge circuit 11 ignores the read data prdata in the high-speed mode and employs a read data hsrdata described below.

The timing control circuit 40, having an address decoder (ADRDEC) 43, a bus cycle manager (BSCYCMNG) 42, and an output selector (SLCTREG) 41, operates in synchronization with the high-speed clock signal CLKH.

The address decoder 43 decodes the address signal hspa, and supplies a selection pulse HSSLPLS to the output selector 41.

The bus cycle manager 42 is activated by the high-level of the operation request signal hsprq, and activates the output selector 41 by an enable signal rdenb, when a read operation is instructed by the read/write signal hspwr. The activated output selector 41 selects one from the register data REGDAT supplied from the register circuit 31 according to the selection pulse HSSLPLS that is the result of decoding the address signal hspa, and outputs the selected data hsprdata to the bridge circuit 11. An access strobe signal hsp_end is changed from high level to low level at a timing when the output of the data hsprdata is determined.

While activated by the high-level of the operation request signal hsprq, the bus cycle manager 42 changes, when a write operation is instructed by the high level of read/write signal hspwr, the access strobe signal hsp_end from high level to low level at the timing of completing the write operation. A synchronization signal hspsync is used for generating the timing of completing the write operation. The synchronization signal hspsync is a signal whose pulse is changed to a high level only during a single cycle of the high-speed clock signal CLKH for each cycle of the low-speed clock signal CLKL. When a write operation is instructed, the bus cycle manager 42 changes the pulse of the access strobe signal hsp_end to high-level, after the timing of instructing the write operation, in synchronization with changing the pulse of the synchronization signal hspsync to high-level. If a write operation is instructed by a high level of the read/write signal hspwr, the enable signal rdenb is kept inactive.

Now the functions of the bus cycle manager 42 are summarized. The bus cycle manager 42 performs an operation for synchronizing with the low-speed clock signal CLKL when writing is requested, and outputs the access strobe signal hsp_end regarded as release of the bus in synchronization with the low-speed clock, after a number of cycles at least necessary for writing has passed. When reading is requested, the access strobe signal hsp_end is raised simultaneously with output of the read data, and release of the bus is transmitted to the bridge circuit 11. The signal hspsync is input to the bus cycle manager 42 to control the access strobe signal hsp_end. The signal hspsync is a signal issued at the timing of synchronization of the low-speed clock CLKL and the high-speed clock CLKH and, at writing, changes the access strobe signal hsp_end to the high level, judging the right timing using this signal as described above.

Figure 3:
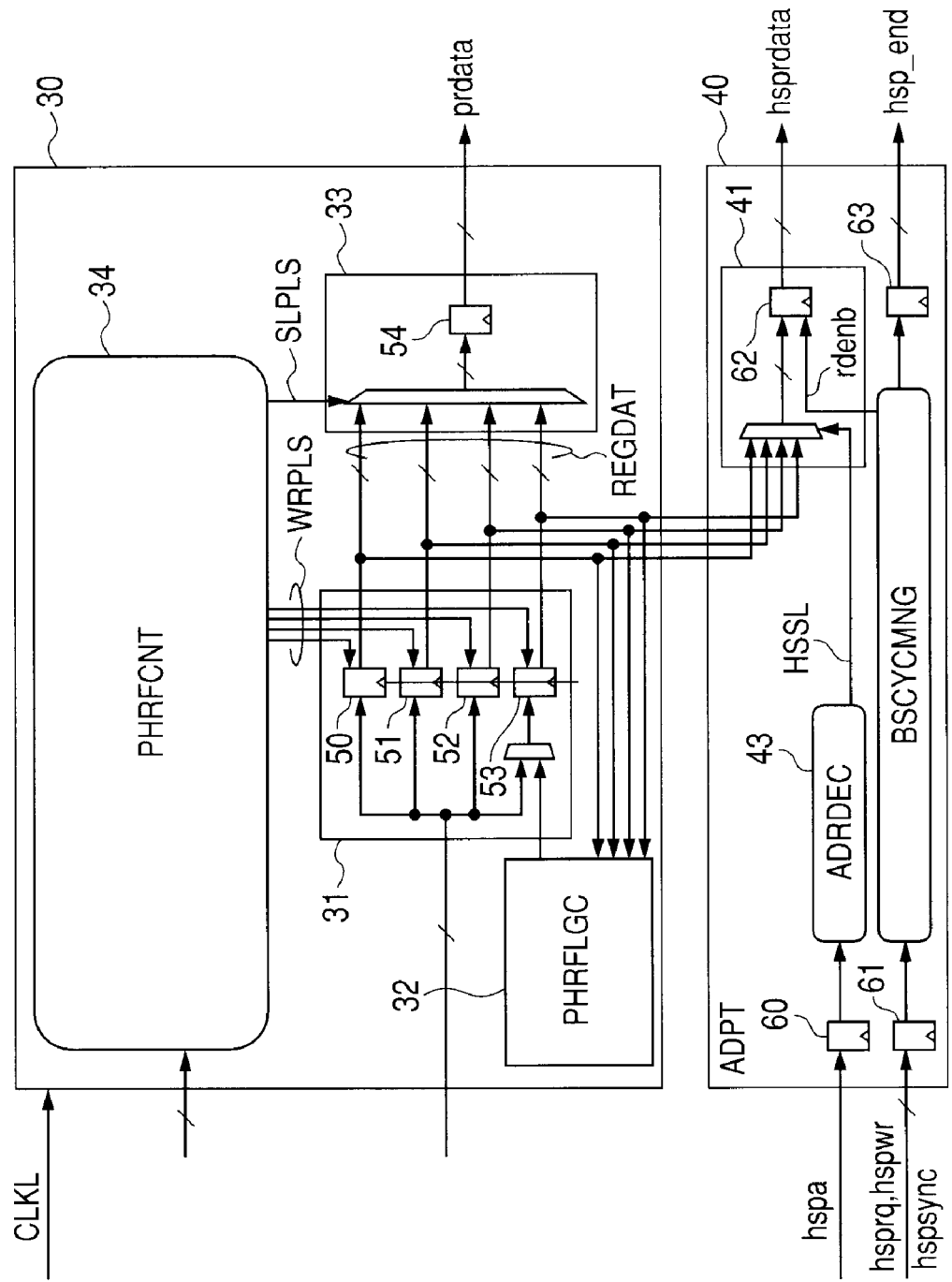
FIG. 3 is a block diagram showing an exemplary register circuit 31 and output selectors 33 and 41.

FIG. 3 shows a specific example of the register circuit 31 and output selectors 33 and 41. Latch circuits 50 to 53 composing the register circuit 31 and a latch circuit 54 provided at the output stage of the output selector 33 perform latch operation in synchronization with the low-speed clock signal CLKL. Latch circuits 60 and 61 provided at the input stage of the timing control circuit 40, and latch circuits 62 and 63 provided at the output stage of the timing control circuit 40 perform latch operation in synchronization with the high-speed clock signal CLKH.

Figure 4:
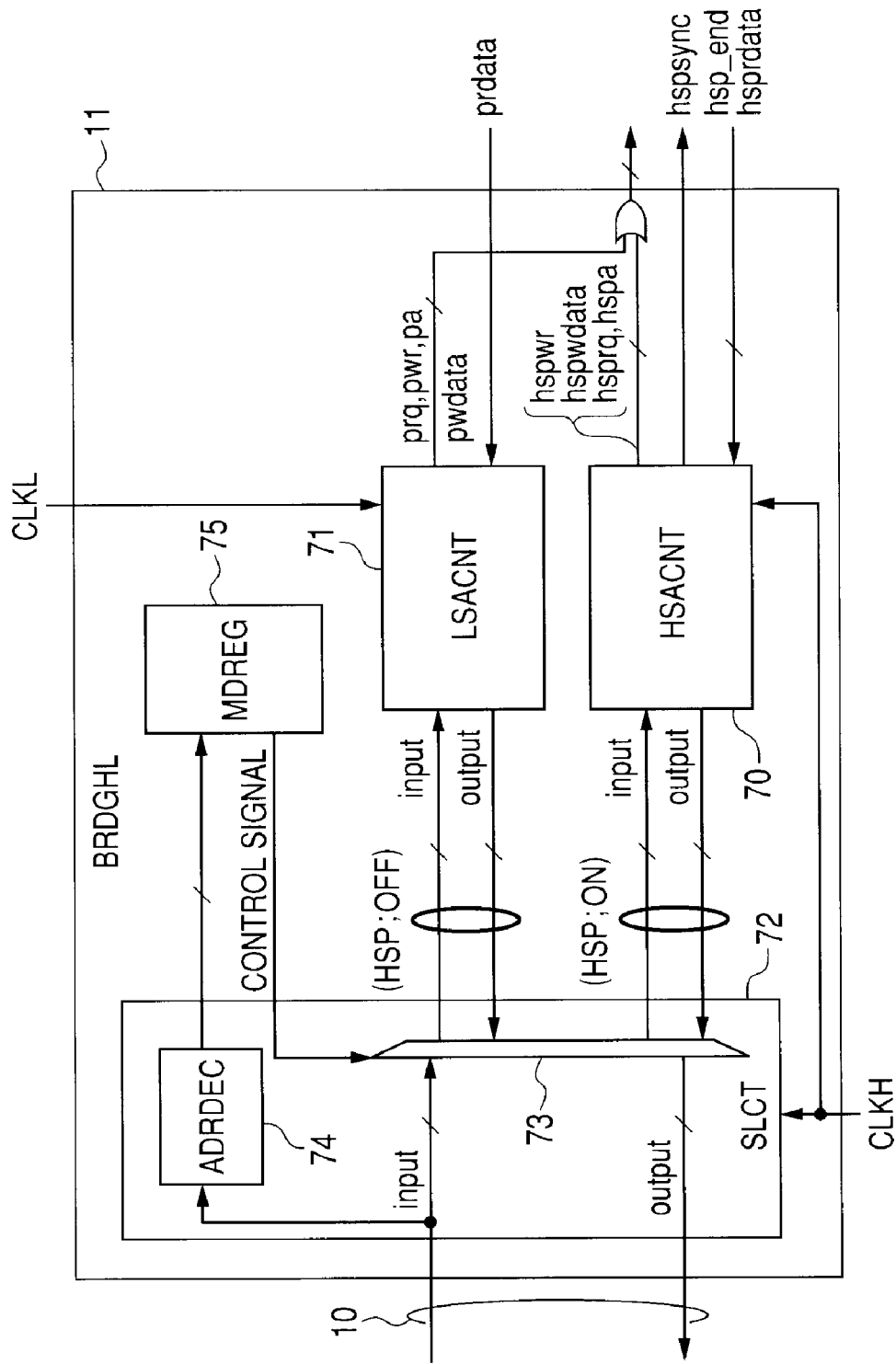
FIG. 4 is a block diagram showing an exemplary bridge circuit 11.

FIG. 4 shows a specific example of the bridge circuit 11. The bridge circuit 11 has a low-speed access timing control circuit (LSACNT) 71 that performs timing control for accessing the peripheral circuit in the low-speed mode and a high-speed access timing control circuit (HSACNT) 70 that performs timing control for accessing the peripheral circuit in the high-speed mode, where the selection circuit (SLCT) 72 selects which one to be used according to the value set in a mode register (MDREG) 75. The mode register 75 stores mode data for specifying which one of the high-speed mode or the low-speed mode to be applied for each peripheral circuit. Although not shown in particular, the mode data is transferred from a suitable nonvolatile memory to the mode register 75 at power on reset and initialized therein. The selection circuit 72 has an address decoder (ADRDEC) 74 and a selector 73, where the address decoder 74 decodes the access target address provided from the CPU and the selector specifies the target to which the bus 10 is coupled to be either the low-speed access timing control circuit 71 or the high-speed access timing control circuit 70 according to the mode bit read from the mode register 75 by the decode signal. In this manner, the operation mode (high-speed operation mode/low-speed operation mode) specified according to the mode bit of the mode data can be selected by the access target address.

Figure 5:
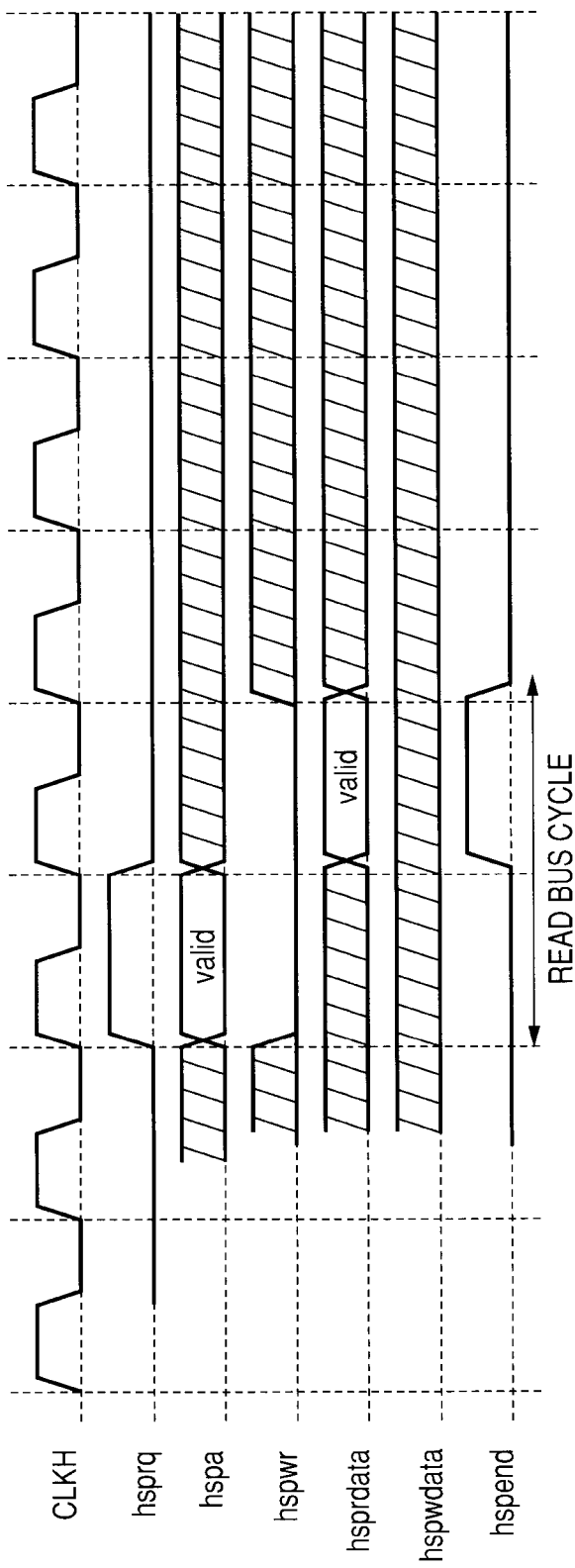
FIG. 5 is a timing chart exemplifying a basic protocol of a read operation in a high-speed mode.

FIG. 5 shows an exemplary basic protocol of the read operation in the high-speed mode. The operation is outlined as follows.

1. A signal hsprq rises in synchronization with the high-speed clock signal CLKH.
2. In parallel with the above, an effective address hspa and a read/write signal hspwr are turned into the low level (low-level; read instruction, high-level; write instruction).
3. Effective data hsprdata is output in the cycle of the next high-speed clock signal CLKH, hsp_end is changed in parallel with the above, and the end of access is notified to the bridge circuit 11.

As thus described, data of the register circuit 31 can be read accessed in synchronization with the high-speed clock signal CLKH in the high-speed mode. Efficiency of read access can be improved compared with reading in synchronization with the low-speed clock signal CLKL in the low-speed mode, which contributes to improving efficiency of data processing. Additionally, when an interrupt occurs by the interrupt signal INT, read access efficiency of the register circuit 31 can be improved when the CPU 2 acquires information for determining the cause of interrupt from the peripheral circuit of the interrupt requestor to determine the process routine that responses to the interrupt. Therefore, interrupt response can also be improved.

Figure 6:
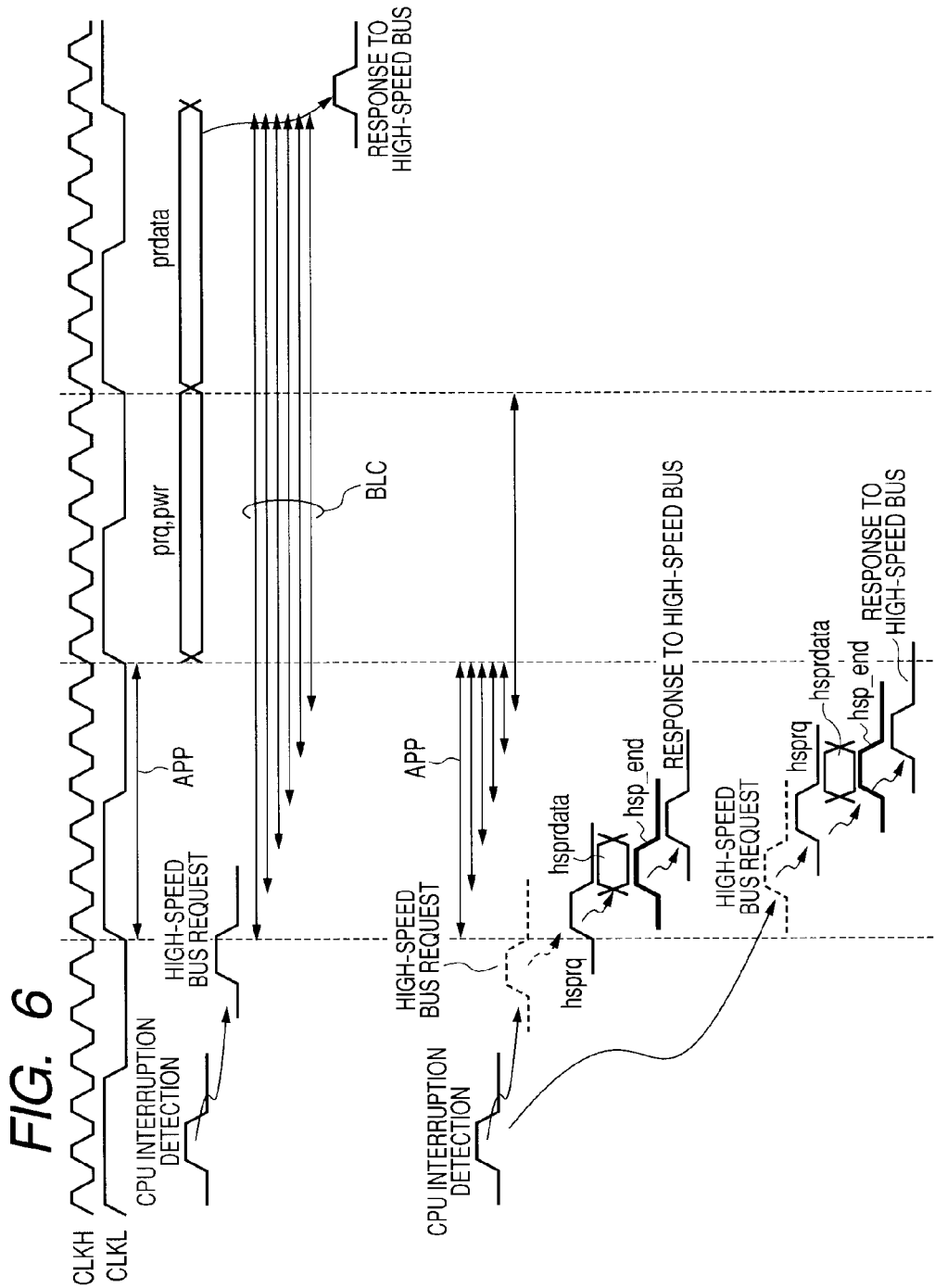
FIG. 6 is a timing chart exemplifying a register read operation in a low-speed mode and a register read operation in a high-speed mode.

FIG. 6 shows an exemplary timing chart of register read operations in the low-speed mode and the high-speed mode. Here, timing from interrupt detection by the CPU 2 to register reading is shown.

Upon detecting an interrupt, the CPU 2 outputs a request to access the peripheral circuit of the interrupt requestor to the bus 7, referring to interrupt requestor information notified from the interrupt controller 3. When the access request reaches the bridge circuit 11, the bridge circuit 11 receives the access request (high-speed bus request) in synchronization with the clock signal CLKH. Here, it is assumed that the bridge circuit 11 receives high-speed bus requests during the period of APP. If the low-speed mode is specified for the access target peripheral circuit in this occasion, the peripheral circuit receives a request prq and a read signal pwr at the rise of the next low-speed clock signal CLKL, and outputs register data (prdata) in synchronization with the further next rise of the low-speed clock signal CLKL. The bus cycle period at this time is 15.5 cycles in terms of the number of cycles of the high-speed clock signal CLKH if the frequency ratio between the high-speed clock signal CLKH and the low-speed clock signal CLKL is 6:1, for example. That is, BCL=(6+5+4+3+2+1)/6+6+6=15.5 cycles.

If, on the other hand, the high-speed mode is specified for the access target peripheral circuit, the bridge circuit 11, upon receiving a high-speed bus request, outputs a request hsprq, a read signal hspwr and the like to the peripheral circuit in synchronization with the rise of the high-speed clock signal CLKH, and further outputs register data (hsprdata) in synchronization with the next rise of high-speed clock signal CLKH, and also changes the pulse of the signal hsp_end. The bus cycle period in this occasion is significantly shortened compared with the low-speed mode.

As thus described, setting to the high-speed mode allows the CPU 2 to read internal information of the peripheral circuit in synchronization with the high-speed clock signal CLKH, and whereby the CPU 2 can acquire the register information inside the peripheral circuit at the same timing as when the peripheral circuit 30 itself is operated by the high-speed clock signal CLKH.

Figure 7:
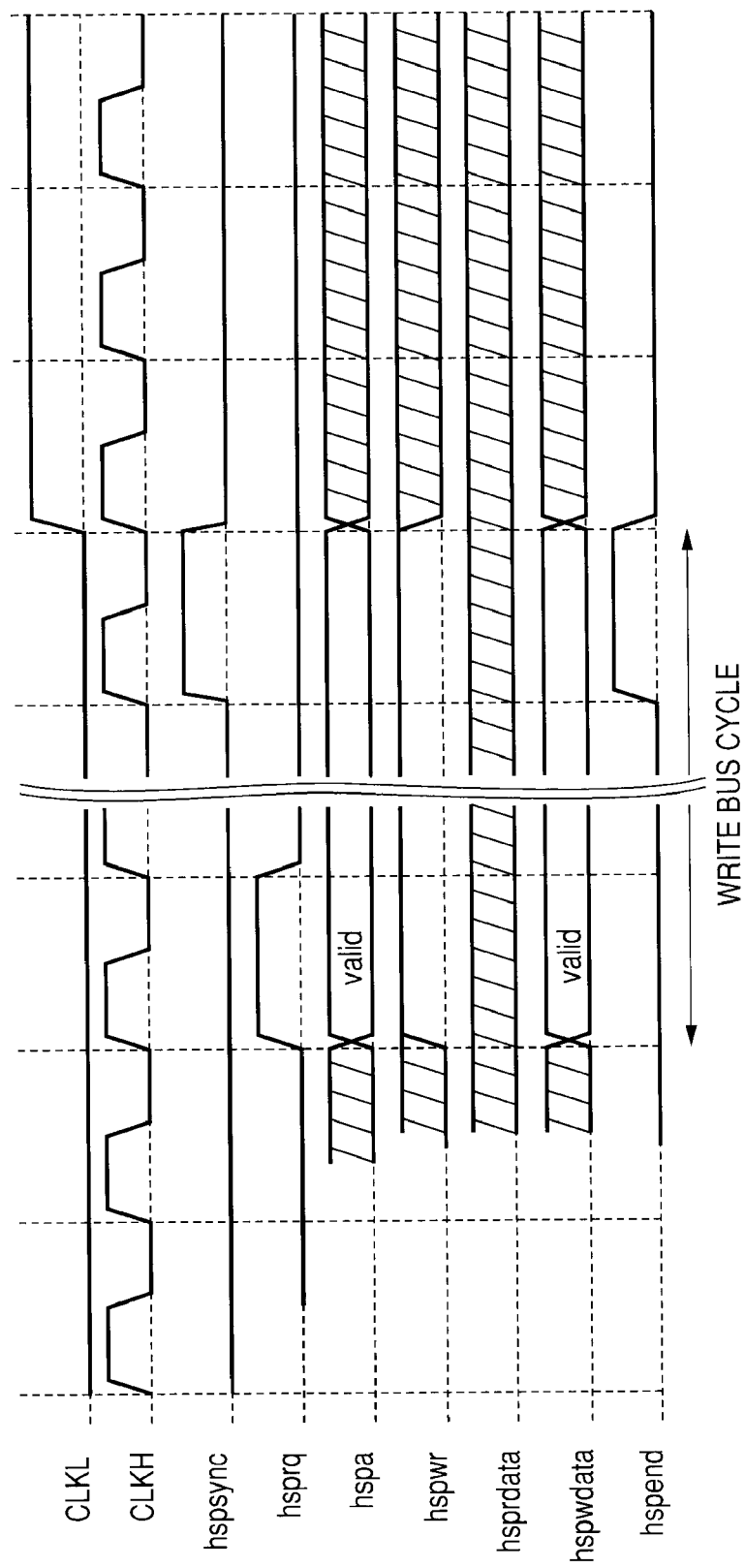
FIG. 7 is a timing chart showing a basic protocol of a write operation in high-speed mode.

FIG. 7 shows an exemplary basic protocol of the write operation in the high-speed mode. The operation is outlined as follows:

1. A request hsprq rises in synchronization with the high-speed clock signal CLKH.
2. In parallel with this, the effective address hspa and the write data hspwdata are output, and the read/write signal hspwr is turned into the high-level (low-level; read instruction, high-level; write instruction).
3. Output operation of 2. is maintained (write strobe) until next rise of the low-speed clock signal CLKL.
4. The bus is released with hsp_end turned into the high-level at the next rise of the low-speed clock. At the timing of the low-speed clock signal, writing data into the register is completed. Since the write request occurs at the timing of an arbitrary high-speed clock signal CLKH in a single cycle of the low-speed clock signal CLKL, it is necessary to occupy the bus until the low-speed clock signal CLKL rises. The signal hspsync is input to the bus cycle manager 42 for synchronization in order to perform its control, and the signal hsp_end is controlled by the signal as described above.

The number of cycles of the high-speed clock signal CLKH required for writing is given as follows. For example, let the speed ratio between the high-speed clock signal CLKH and the low-speed clock signal CLKL be N:1. For the conventional writing control synchronizing with the cycle of the low-speed clock signal CLKL, the number of clocks of the write operation is cyc_req_org+cyc_strobe_org . . . (1). cyc_req_org is the number of high-speed clocks until the next rise of the low-speed clock. cyc_strobe_org is the number of cycles required for writing (conventionally, 2 cycles in the low-speed clock signal CLKL, that is, 2N cycles were required).

On the other hand, for the write control that starts the write operation in synchronization with the high-speed clock signal CLKH described in FIG. 7, the number of clocks of write operation is cyc_req_hsp+cyc_strobe_hsp . . . (2). cyc_req_hsp is the number of cycles (=1) until the next high-speed clock signal CLKH rises. cyc_strobe_hsp, the number of cycles until the next low-speed clock signal CLKL rises, is [1+(1+2+3+ . . . +N)/N] . . . (3) for writing in synchronization with the high-speed clock signal CLKH, and [2N+(1+2+3+ . . . +N)/N] . . . (4) for conventional writing.

Expressions 3 and 4 suggest that the present invention sufficiently contributes to improving the performance of write operation, even if N=2.

Figure 8:
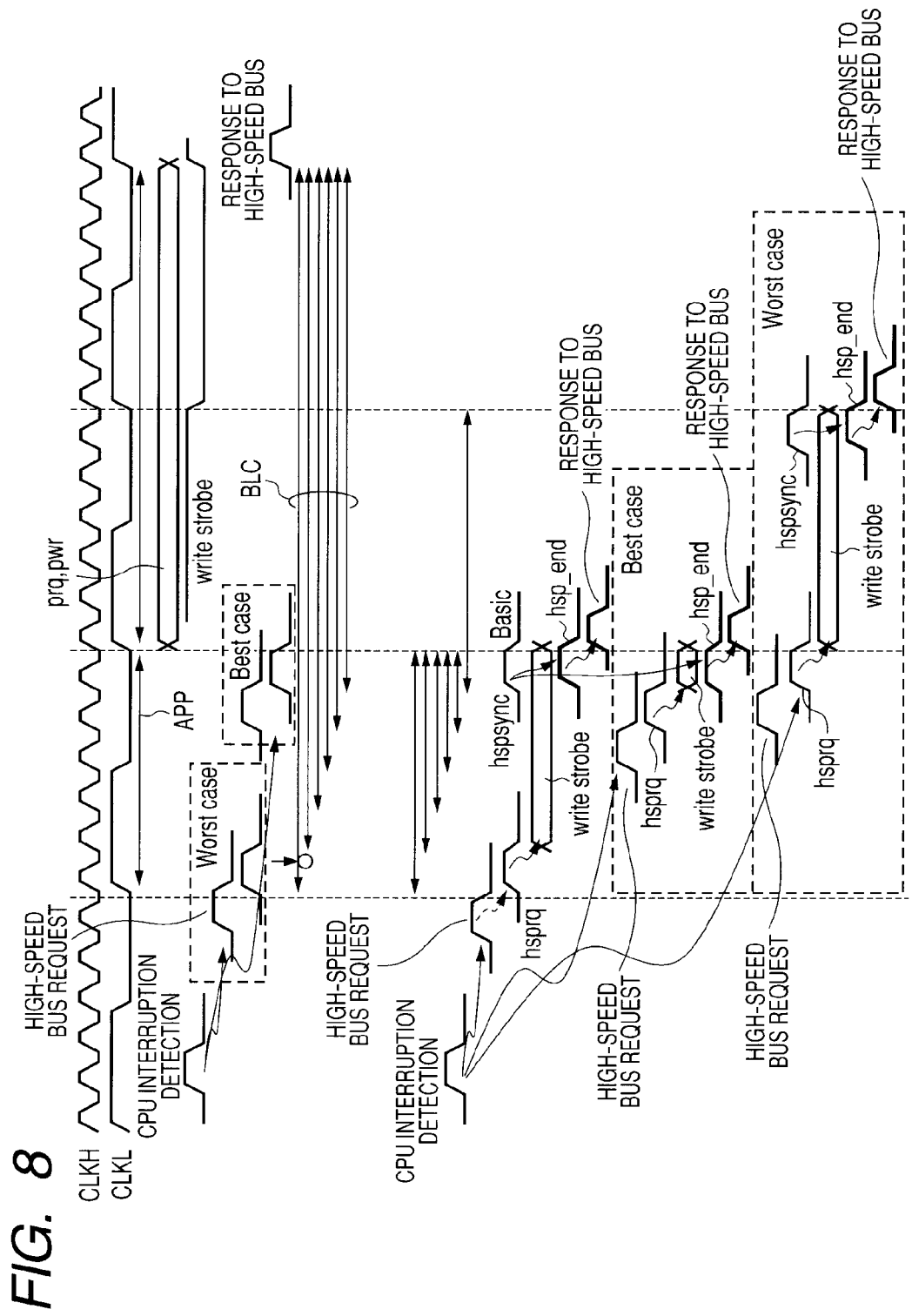
FIG. 8 is a timing chart exemplifying a register write operation in a low-speed mode and a register write operation in a high-speed mode.

FIG. 8 shows an exemplary timing chart of register write operations in the low-speed mode and the high-speed mode. Here, there is shown an exemplary timing of the register write operation from when an interrupt is detected by the CPU 2.

The CPU detects an interrupt and, based thereon, outputs a request to the bus 7 for accessing the peripheral circuit to write therein. When the access request reaches the bridge circuit 11, the bridge circuit 11 receives the access request (high-speed bus request) in synchronization with the clock signal CLKH. Here, it is assumed that the bridge circuit 11 receives a high-speed bus request during the APP period. If the low-speed mode is specified for the access target peripheral circuit in this occasion, the peripheral circuit receives the request prq and the write signal pwr at the next rise of the low-speed clock signal CLKL, and data is written into the register in synchronization with the further next rise of the low-speed clock signal CLKL. For example, if the frequency ratio between the high-speed clock signal CLKH and the low-speed clock signal CLKL is 6:1, the bus cycle period at this time is BCL=15.5 cycles similarly with the case of register read in the low-speed mode.

If, on the other hand, the high-speed mode is specified for the access target peripheral circuit, the bridge circuit 11, upon receiving a high-speed bus request, keeps a request hsprq, a write signal hspwr, and write data hspwdata in the peripheral circuit during the corresponding cycle period of the low-speed clock signal CLKL (write strobe period), in synchronization with the rise of the high-speed clock signal CLKH. At the end of the cycle period of the low-speed clock signal CLKL, the pulse of the signal hsp_end controlled by the signal hspsync is changed, and completion of writing is notified to the bus bridge circuit 11.

Using the high-speed mode, the bus cycle period can be shortened also for write access compared with the low-speed mode.

By employing the timing control circuit 40 as the adapter module described above and the bridge circuit 11 having the high-speed mode, it suffices to operate only the timing control circuit 40 by the high-speed clock signal without having to supply high-speed clock signals to the register circuit itself of the peripheral circuit. In this manner, substantial increase of power consumption can be suppressed to improve the efficiency of data processing, and good interrupt response can be acquired as well, compared with the case of operating all the peripheral circuits at a high speed in synchronization with the high-speed clock signal.

The timing control circuit 40 also has a function of stopping the operation in order to reduce power consumption. Supply of clock signals to the timing control circuit 40 that need not operate can be stopped by enabling the module stop signal mstp, which also contributes to low power consumption.

Figure 9:
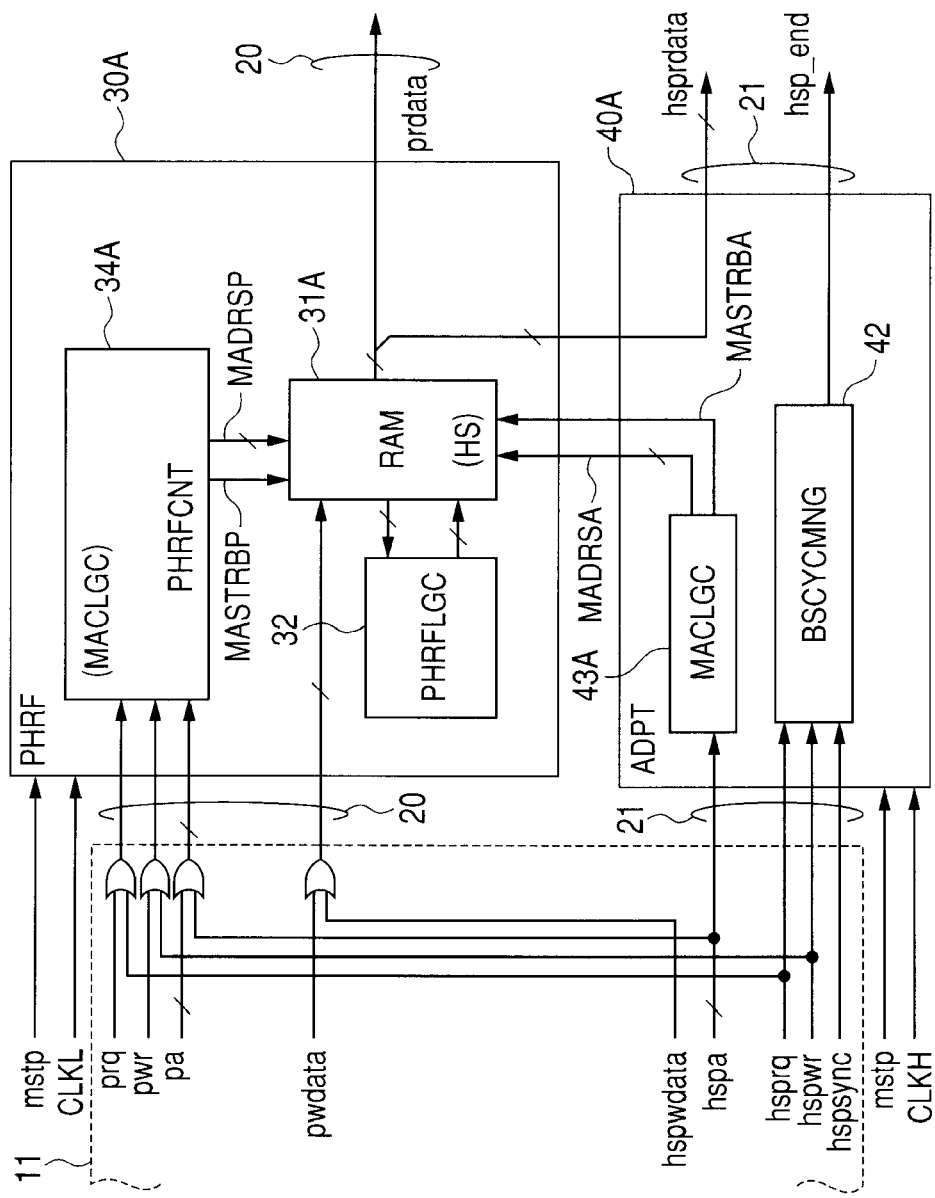
FIG. 9 is a block diagram showing an example in which a RAM is employed in place of the register circuit as a storage circuit.

FIG. 9 shows an example in which a RAM is used in place of the register circuit as the storage circuit. A RAM 31A is a high-speed (HS) RAM capable of memory operation in synchronization with the cycle of the high-speed clock signal CLKH. A peripheral control circuit 34A generates a local address MADRSP of the RAM 31A from an address pa/hspa, and generates a memory access strobe signal MASTRBP such as a memory enable signal and a memory read/write signal, based on the signals pwr/hspwr and prq/hsprq. A memory control logic (MACLGC) 43A is employed for accessing the RAM 31A also in the timing control circuit 40A as with the modification of the peripheral circuit 30A. The memory control logic 43A generates a local address MADRSA of the RAM 31A from the address hspa, and generates a memory access strobe signal MASTRBA such as the memory enable signal and the memory read/write signal, based on the signals hspwr and hsprq.

Although the local address signal MADRSP and the memory access strobe signal MASTRBP are changed in synchronization with the low-speed clock signal CLKL, and the local address signal MADRSA and the memory access strobe signal MASTRBA are changed in synchronization with the high-speed clock signal CLKH, the RAM 31A, which is of a high speed type, operates at a high speed in response to access control from the timing control circuit 40A. Therefore, a similar effect can be obtained for the case of FIG. 9 as with the configuration described in FIG. 2.

Figure 10:
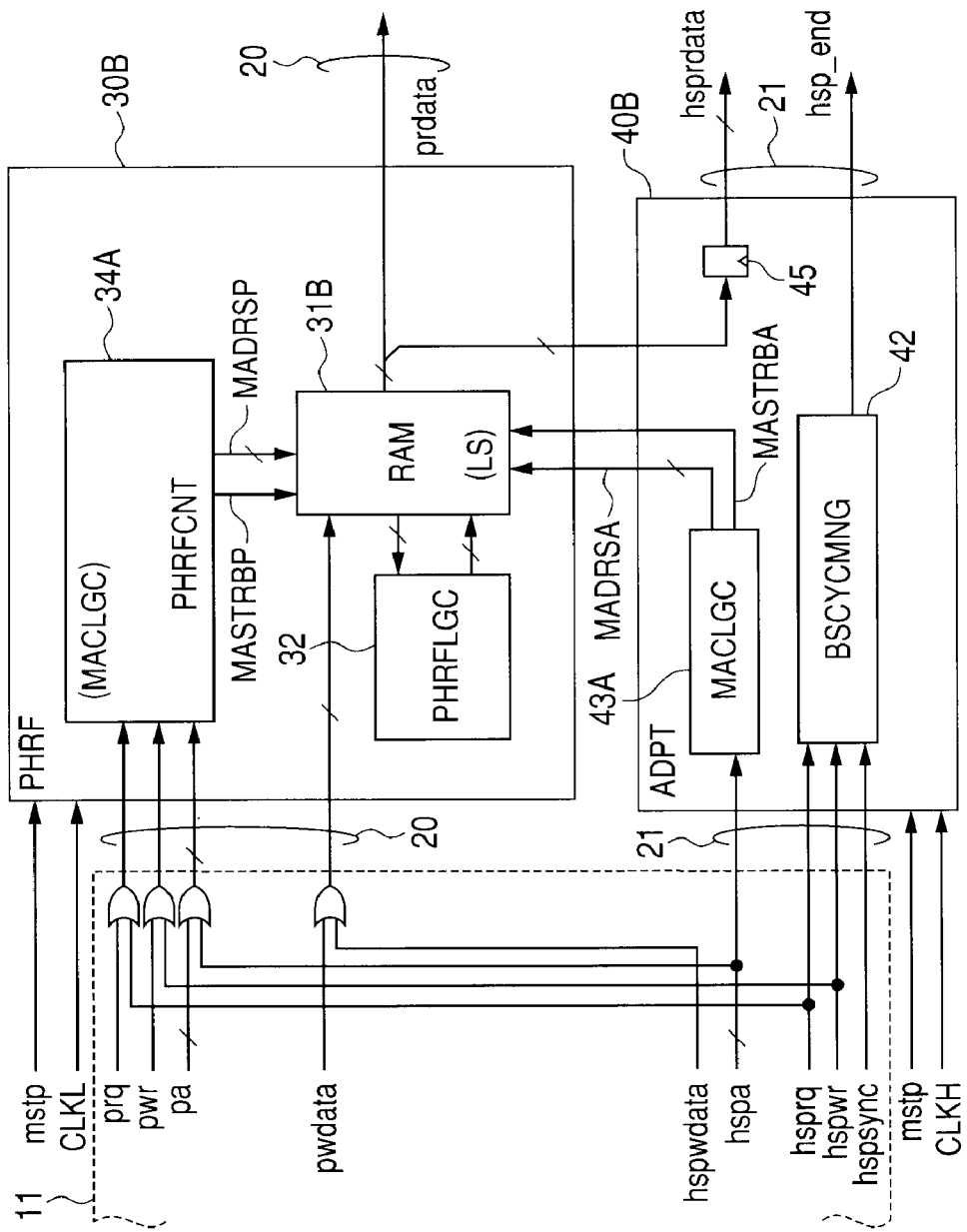
FIG. 10 is a block diagram showing an example in which a low-speed RAM is employed as the storage circuit.

FIG. 10 shows an example in which a low-speed RAM is employed as the storage circuit. In contrast with the configuration of FIG. 9, a RAM 31B is a low-speed type (LS) that can operate with the cycle of the clock signal CLKL. In this case, a timing control circuit 40B is provided with a latch circuit 45 at the output stage of the data hsprdata to perform latch operation at hspsync, and outputs data that is output from the low-speed RAM 31B after latching the data at the timing the data is determined. This configuration cannot be expected to significantly increase the speed of data output operation even if it is in the high-speed mode.

Figure 11:
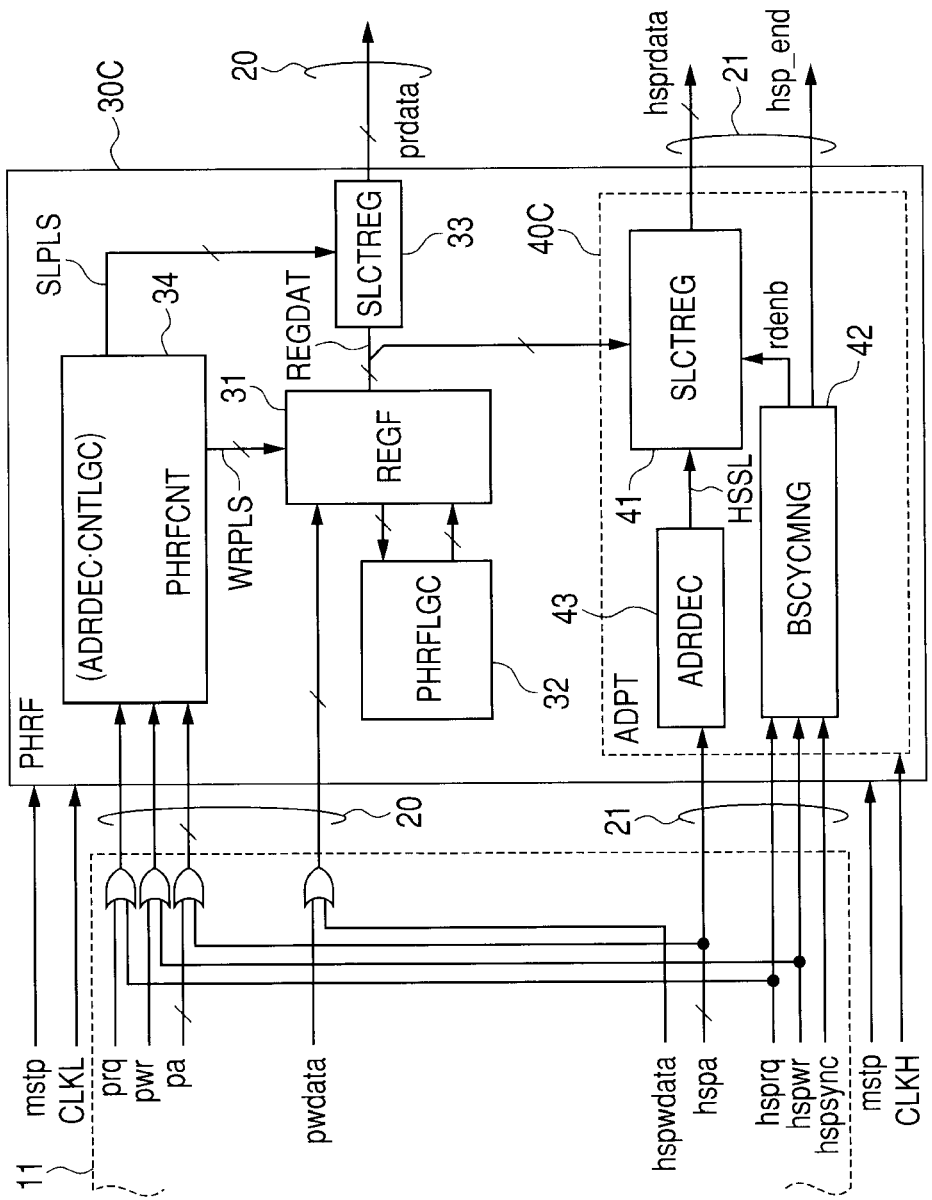
FIG. 11 is a block diagram exemplifying an IP module that has incorporated the function of the timing control circuit as an adapter module into the peripheral circuit.

FIG. 11 shows an exemplary IP module that has incorporated the function of the timing control circuit as the adapter module into the peripheral circuit. A timing control circuit 40C is operated in synchronization with the high-speed clock signal CLKH. In this case, however, an enormous work load is necessary to newly generate IP module data by changing the design of the peripheral circuit, which is the original IP module operating at a low-speed.

Figure 12:
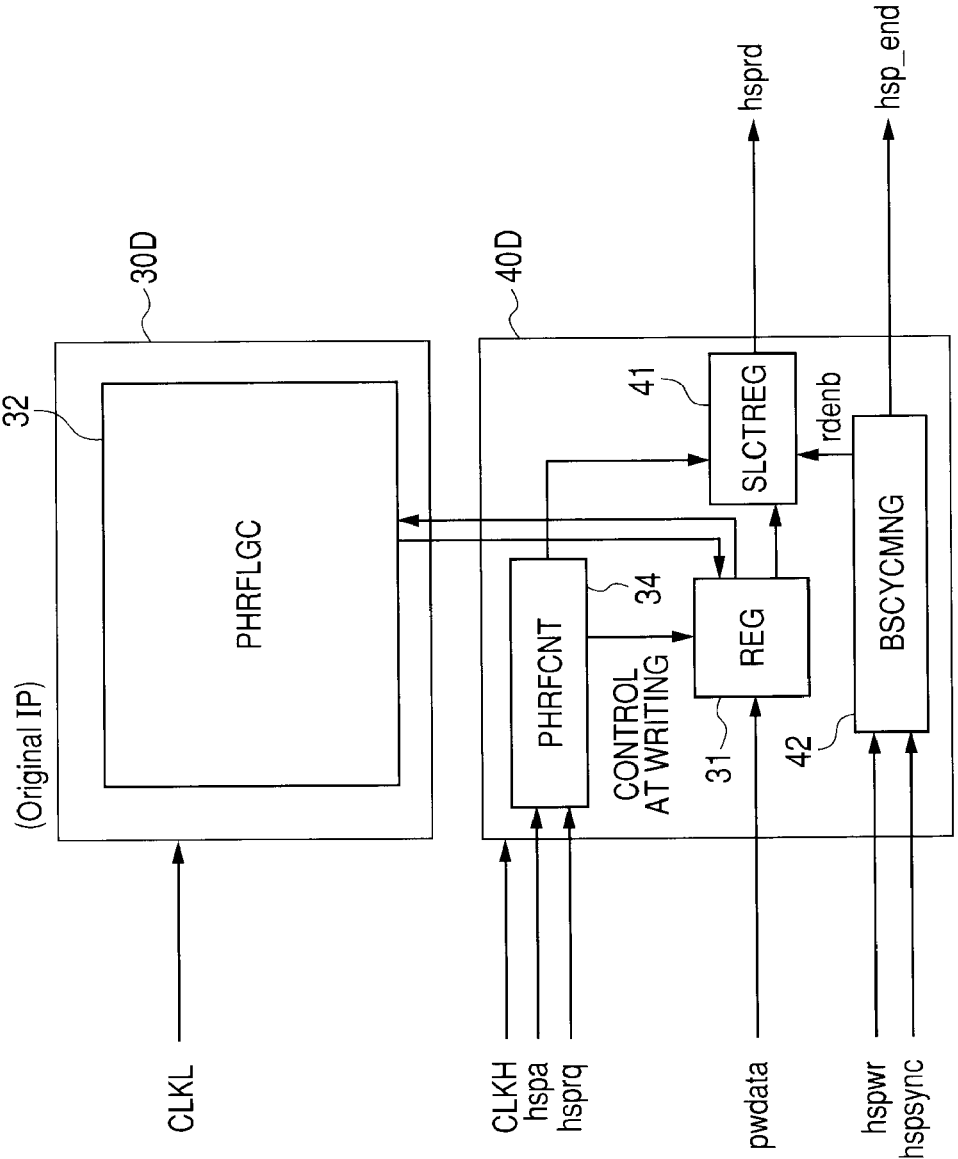
FIG. 12 is a block diagram exemplifying a configuration in which apart other than the logic function such as register access performed by the peripheral circuit which is the original IP module is separated and the separated part is newly developed as a register access block.

FIG. 12 shows an exemplary configuration that separates a part other than the logic function (PHRFLGC) 32 such as register access executed by the peripheral circuit which is the original IP module, where the separated part is newly developed as a register access block (REGABLK) to be operated at a high-speed. Although this approach can also perform writing at a high speed, work load for changing the existing original IP becomes too large.

The present invention made by the inventors has thus been described in detail based on the embodiment, it is needless to say that the present invention can be modified in the range that does not deviate from the concept thereof.

For example, the first circuit for accessing the peripheral circuit is not limited to the CPU, and may be an accelerator or DMAC that reduces the CPU load. The second circuit is not limited to the peripheral circuit of the CPU and may be a bus slave accessed by the bus master or a target accessed by the initiator. The bus configuration is not limited to that having the split transaction bus and the interlocking bus such as shown in FIG. 1 coexisting, but may be either one of the bus configurations.

The present invention can be widely applied to semiconductor devices for data processing such as a data processor comprising circuit blocks having different operation speeds. The semiconductor device may be either multi-chip or single-chip.

What is claimed is:

1. A semiconductor device comprising:
a first circuit operated in synchronization with a first clock signal;
a second circuit block operated in synchronization with a second clock signal having a frequency lower than that of the first clock signal;
a bridge circuit that performs timing control of access from the first circuit to the second circuit block; and
a third circuit block provided between the second circuit block and the bridge circuit to perform, based on an instruction from the bridge circuit, an operation of outputting data held by a storage circuit in the second circuit block to the bridge circuit in synchronization with the cycle of the first clock signal.

2. The semiconductor device according to claim 1,
wherein the bridge circuit starts, in response to an instruction of a read operation directed to the storage circuit from the first circuit, an output operation cycle to the bridge circuit by the third circuit block in synchronization with the cycle of the first clock signal, waits for a notice of completion of the output operation by the third circuit block, and terminates the output operation cycle.

3. The semiconductor device according to claim 2,
wherein the bridge circuit starts, in response to an instruction of a write operation directed to the storage circuit from the first circuit, a write operation into the storage circuit in synchronization with the cycle of the first clock signal, waits for a notice of completion of the write operation into the storage circuit synchronizing with the cycle of the second clock signal, and terminates the write operation cycle.

4. The semiconductor device according to claim 3,
wherein the first circuit is a CPU, further comprising an interrupt controller that outputs an interrupt signal to the first circuit in response to interrupt request from the second circuit block.

5. The semiconductor device according to claim 3,
wherein the second circuit block has a register circuit as the storage circuit, latch timing of the register circuit is controlled in synchronization with the second clock signal and selection timing of a latch output signal of the register circuit is synchronized with the second clock signal, and
wherein the third circuit block receives the latch output signal of the register circuit, and the selection timing of the received latch output signal is synchronized with the first clock signal.

6. The semiconductor device according to claim 3,
wherein the second circuit block is a clock synchronization type RAM that can operate as the storage circuit using the cycle of the second clock signal as a memory cycle, and
wherein the third circuit block has a latch circuit that latches the data read from the clock synchronization type RAM in synchronization with the second clock signal.

7. The semiconductor device according to claim 3,
wherein the second circuit block is a clock synchronization type RAM that can operate as the storage circuit using the cycle of the first clock signal as a memory cycle;
wherein the second circuit block operates the clock synchronization type RAM using the cycle of the second clock signal as a memory cycle; and
wherein the third circuit block operates the clock synchronization type RAM using the cycle of the first clock signal as a memory cycle.

8. A semiconductor device comprising:
a first circuit operated in synchronization with a first clock signal;
a second circuit block operated in synchronization with a second clock signal having a frequency lower than that of the first clock signal;
a bridge circuit that performs timing control of access from the first circuit to the second circuit block and has a first mode and a second mode; and
a third circuit block provided between the second circuit block and the bridge circuit,
wherein the bridge circuit, in the first mode, causes the third circuit block to output data held by a storage circuit within the second circuit block to the bridge circuit in synchronization with the cycle of the first clock signal and,
wherein the bridge circuit, in the second mode, causes the second circuit block to output data held by the storage circuit to the bridge circuit in synchronization with the cycle of the second clock signal.

9. The semiconductor device according to claim 8,
wherein in the first mode the bridge circuit starts, in response to an instruction of a read operation directed to the storage circuit from the first circuit, an output operation cycle to the bridge circuit by the third circuit block in synchronization with the cycle of the first clock signal, waits for a notice of completion of the output operation by the third circuit block, and terminates the output operation cycle.

10. The semiconductor device according to claim 9,
wherein in the first mode the bridge circuit starts, in response to an instruction of a write operation directed to the storage circuit from the first circuit, a write operation into the storage circuit in synchronization with the cycle of the first clock signal, waits for a notice of completion of the write operation into the storage circuit synchronizing with the cycle of the second clock signal, and terminates the write operation cycle.

11. The semiconductor device according to claim 10,
wherein the bridge circuit has a mode register that stores mode data for specifying which of the first mode or the second mode will be applied for each access target, and a bus access control unit that performs timing control of access in the mode based on the mode data stored in the mode register according to the access address from the first circuit.

12. The semiconductor device according to claim 11,
wherein the second circuit block has a register circuit as the storage circuit, latch timing of the register circuit is controlled in synchronization with the second clock signal, and selection timing of a latch output signal of the register circuit is synchronized with the second clock signal, and
wherein the third circuit block receives the latch output signal of the register circuit, and selection timing of the received latch output signal is synchronized with the first clock signal.

13. The semiconductor device according to claim 11,
wherein the second circuit block is a clock synchronization type RAM that can operate as the storage circuit using the cycle of the second clock signal as a memory cycle, and
wherein the third circuit block has a latch circuit that latches the data read from the clock synchronization type RAM in synchronization with the second clock signal.

14. The semiconductor device according to claim 11,
wherein the second circuit block is a clock synchronization type RAM that can operate as the storage circuit using the cycle of the first clock signal as a memory cycle;
wherein the second circuit block operates the clock synchronization type RAM using the cycle of the second clock signal as a memory cycle; and
wherein the third circuit block operates the clock synchronization type RAM using the cycle of the first clock signal as a memory cycle.

15. A data processor comprising:
a CPU operated in synchronization with a first clock signal;
a plurality of peripheral circuits operated in synchronization with a second clock signal having a frequency lower than that of the first clock signal;
a bus controller that performs timing control of access from the CPU to the peripheral circuits; and
a timing control circuit that is provided between the peripheral circuits and the bus controller and performs an operation of outputting data held by the peripheral circuits to the bus controller based on an instruction from the bus controller in synchronization with the cycle of the first clock signal.

16. The data processor according to claim 15, further comprising an interrupt controller that outputs an interrupt signal to the CPU in response to an interrupt request from the peripheral circuit.

17. The data processor according to claim 16,
wherein the bus controller starts, in response to an instruction of a read operation directed to the peripheral circuit from the CPU, an output operation cycle to the bus controller by the timing control circuit in synchronization with the cycle of the first clock signal, waits for a notice of completion of the output operation by the timing control circuit, and terminates the output operation cycle.

18. The data processor according to claim 17,
wherein the bus controller starts, in response to an instruction of a write operation directed to the peripheral circuit from the CPU, a write operation into the peripheral circuit in synchronization with the cycle of the first clock signal, waits for a notice of completion of the write operation into the peripheral circuit synchronizing with the cycle of the second clock signal, and terminates the write operation cycle.

19. A data processor comprising:
a CPU operated in synchronization with a first clock signal;
a plurality of peripheral circuits operated in synchronization with a second clock signal having a frequency lower than that of the first clock signal;
a bus controller that performs timing control of access from the CPU to the peripheral circuits; and
a timing control circuit that is provided between the peripheral circuits and the bus controller,
wherein the bus controller causes the timing control circuit to output data held by the peripheral circuits to the bus controller in synchronization with the cycle of the first clock signal in response to a read instruction from the peripheral circuit, causes the timing control circuit to start writing into the peripheral circuits in synchronization with the cycle of the first clock signal in response to a write instruction into the peripheral circuits, and terminates the writing in synchronization with the cycle of the second clock signal.

* * * * *